United States Patent [19]

Jackson et al.

[11] Patent Number: 5,480,939
[45] Date of Patent: Jan. 2, 1996

[54] PRIMER FOR POLYOLEFIN CONTAINING CHLORINATED POLYOLEFIN AND RUBBERIZED EPOXY

[75] Inventors: Michael L. Jackson, LaGrange; Robert J. Abbate; Nicholas J. Sopcich, both of Calumet City, all of Ill.; Raymond J. Moeller, Jr., Cedar Lake; Mark Hodapp, Schererville, both of Ind.; Greg Palagi, Tinley Park, Ill.

[73] Assignee: Bee Chemical Company, Lansing, Ill.

[21] Appl. No.: 463,599

[22] Filed: Jun. 5, 1995

Related U.S. Application Data

[63] Continuation-in-part of Ser. No. 300,303, Sep. 2, 1994, abandoned.

[51] Int. Cl.⁶ ............................ C08L 23/28; C08L 63/10
[52] U.S. Cl. ............................................ 525/120; 525/108
[58] Field of Search .................................. 525/108, 120

[56] References Cited

U.S. PATENT DOCUMENTS

| | | | |
|---|---|---|---|
| 4,061,579 | 12/1979 | Sawko et al. | 252/8.1 |
| 4,513,060 | 4/1985 | Vasta | 523/435 |
| 4,861,833 | 8/1989 | Chasser et al. | 525/122 |
| 5,317,067 | 5/1994 | Yagi et al. | 525/122 |

FOREIGN PATENT DOCUMENTS

| | | |
|---|---|---|
| 55-102644 | 8/1980 | Japan . |
| 58-45247 | 3/1983 | Japan . |
| 59-38236 | 3/1984 | Japan . |
| 4-258643 | 9/1992 | Japan . |
| 5-117549 | 5/1993 | Japan . |

OTHER PUBLICATIONS

Derwent accession No. 92–352678/43 for Japanese Patent No. 4–253750, Sep. 1992, Showa Denko.

*Primary Examiner*—Robert E. Sellers
*Attorney, Agent, or Firm*—Wayne E. Nacker; Gerald K. White

[57] ABSTRACT

A primer composition, particularly suitable for a highly plasticized polyolefin substrate, comprises a mixture of chlorinated polyolefin and rubberized epoxy resin.

2 Claims, No Drawings

PRIMER FOR POLYOLEFIN CONTAINING CHLORINATED POLYOLEFIN AND RUBBERIZED EPOXY

This is a continuation-in-part of U.S. application Ser. No. 08/300,303 filed Sep. 2, 1994, now abandoned.

The present invention is directed to coating polyolefin substrates, especially highly plasticized polyolefin substrates, and particularly to a primer composition providing adhesion to the substrate so that a topcoat may be applied.

BACKGROUND OF THE INVENTION

Polyolefins, such as polyethylene, polypropylene, polybutene, etc. are highly hydrophobic compounds, making it difficult to apply a variety of coatings to polyolefin substrates. One type of suitable primer for polyolefin structures is based on chlorinated polyolefin, particularly chlorinated polypropylene. While chlorinated polypropylene works well as a primer for a polyolefin having no plasticizer or very little plasticizer, it works substantially less well for highly plasticized polyolefins, i.e., polyolefins containing about 10% or more plasticizer based upon the weight of the polyolefin.

A particular application for highly plasticized polyolefin is formation of airbag covers for automotive vehicles. An airbag will be located so as to deploy during impact and protect an occupant from the effects of collision, for example, a driver's side airbag will typically be located in the hub of the steering wheel. For appearance sake, the airbag has a cover. This cover must be of sufficient weakness to be torn away during airbag deployment.

An airbag deploys very rapidly and with very substantial force. Fragmenting particles, such as fragmenting particles of an airbag cover, could cause serious damage to an occupant, particularly because the airbag deploys in the area of the occupant's face. Accordingly, airbag covers are made of a material which will tear, not fragment, during airbag deployment. Such characteristic of an airbag material cover must hold true over a large ambient temperature range and particularly at cold temperatures down to −40° (C. and F). One suitable material is highly plasticized polypropylene, i.e., polypropylene containing at least about 10% by weight, relative to polypropylene, of plasticizer, such as mineral oil. Typically such highly plasticized polyolefin contains 20 wt % or more plasticizer.

Also for aesthetic purposes, the airbag cover is desirably painted so as to match the decor of the interior of the vehicle. For polypropylene-based substrates, the airbag is first coated with an adhesion promoter or primer and then topcoated with a pigmented paint. This coating system, like the airbag cover itself, must not shatter during airbag deployment (even down to −40°), lest rapidly flying paint flakes injure the vehicle occupants. Rather, the coating system should remain adhered to and tear along with the airbag cover during airbag deployment. Furthermore, the system should have weatherability and durability relative to abrasion to maintain the attractiveness of the airbag cover during the normal life of the vehicle. One type of paint which may be formulated as a topcoat to provide a desired combination of flexibility and weatherability is an isocyanate-cross-linked polyester.

As noted above, chlorinated polyolefin, which is a known adhesion promoter for polypropylene substrates, does not, by itself, function well as an adhesion promoter for highly plasticized polyolefin substrates. It is a primary object of the present invention to provide a primer composition for highly plasticized polyolefins and to utilize such primer on a highly plasticized polyolefin substrate and thereafter apply a topcoat. However, use of the primer of the present invention is not limited to use in highly plasticized polyolefins but is shown to be an excellent primer for hydrophobic polymeric substrates, including non-plasticized polyolefins and elastomers, such as Kraton® elastomers.

SUMMARY OF THE INVENTION

In accordance with the invention a primer composition, particularly suitable for adhering a topcoat to a highly plasticized polyolefin substrate comprises A) between about 30 and about 60 wt % of chlorinated polyolefin and between about 40 and B) about 70 wt % of rubber modified epoxy resin, the weight percents being based on total weight of A) plus B). The composition contains no curative and components A) and B) are not cross reactive, whereby the primer is an air-dry, thermoplastic composition, providing flexibility in addition to adhesion.

DETAILED DESCRIPTION OF CERTAIN PREFERRED EMBODIMENTS

The chlorinated polyolefin A) is produced by conventional chlorination of polyolefins. The reaction is a free radical process catalyzed by heat, ultraviolet radiation and radical initiators. The polyolefin may, for example, be polyethylene, polypropylene, polybutene, polypentene, polyhexene, copolymers thereof, and mixtures thereof. Typically, the chlorinated polyolefin utilized is the of similar monomer composition to the polyolefin to be coated. Thus, a chlorinated polypropylene would be used to coat a highly plasticized polypropylene substrate. The olefin is chlorinated to an extent that between about 10 and about 30 wt %, preferably at least about 20 wt % of the chlorinated polyolefin is chlorine. The chlorinated polyolefin may contain minor amounts of other chemical moieties, provided these moieties do not render the chlorinated polyolefin reactive with the rubberized epoxy. For example, a minor amount of an organic anhydride moiety, such as maleic anhydride, may be grafted to the chlorinated polyolefin.

The rubberized B) epoxy is formed by reacting i) a Bisphenol epoxy resin, e.g., diglycidyl ether of Bisphenol A or epichlorohydrin/Bisphenol A, with ii) a rubber compound having terminal functionality, such as carboxyl, amine and/or hydroxy, which is epoxy-reactive. Bisphenol epoxy resins i) useful for forming the rubberized epoxy have weight average molecular weights ranging from about 300 to about 6000, preferably in the range of about 320 to about 420. Epoxy equivalent weights of the Bisphenol resin i) range from about 150 to about 250.

The rubber component ii) is a polymer formed from monomers, between 50 mole percent and 100% of which are conjugated dienes, i.e., butadiene and/or isoprene. The remaining copolymerized monomers may be styrene, alkyl-substituted styrene, e.g. α-methyl styrene, acrylic acid, alkyl-substituted acrylic acid, alkoxy-substituted acrylic acid, esters of acrylic acid, esters of alkyl-substituted acrylic acid, esters of alkoxy-substituted acrylic acid, acrylonitrile, and mixtures of such comonomers. Preferred rubber components are homopolymers of butadiene and copolymers of butadiene and acrylonitrile. The rubber component has terminal groups or is modified to have terminal groups reactive with epoxy moieties of the Bisphenol resin. The rubber component preferably has a weight average molecular weight of between about 2500 and about 4000.

Based upon 100 parts by weight of the Bisphenol resin i), between about 50 and about 80 parts by weight of the rubber component ii) are reacted therewith, thereby ensuring that the rubberized epoxy retains substantial epoxy functionality. The rubberized epoxy resin B) should have an epoxy equivalent weight of between about 200 and about 1000, preferably between about 300 and about 600.

The composition of the present invention contains no epoxy curative, hardener, epoxy cure catalyst, or cross-linking chemical system. For priming highly plasticized polyolefin substrates, such as those used in airbag covers, it is an advantage of the primer composition that it have a high degree of flexibility. The air-dry compositions of the present invention are inherently thermoplastic, as opposed to thermosetting, a fact which is demonstrable by the fact that the primer coating, after air-drying, may be re-dissolved from the substrate in an organic solvent in which components A) and B) are mutually soluble, such as toluene or xylene. This would not be true if any significant degree of cross-linking were to occur.

To form the primer composition of the present invention the chlorinated polyolefin A) and the rubberized epoxy resin B) are dissolved together in a suitable solvent(s), such as toluene, xylene or mixtures thereof, at an appropriate solids level, typically between about 5 and about 25 wt %. The solution of components A) plus B) is homogeneous, and the primer coating that results when the composition dries is likewise homogeneous.

The primer composition is applied to a substrate, such as a highly plasticized polyolefin substrate, and allowed to dry. Application may be by any conventional means, typically air-atomized spraying or electrostatic spraying. At least about one minute of air drying is allowed before topcoat application. Minimum film thickness is about 0.2–0.4 mils (5–10 μm). Then a topcoat, such as an isocyanate-cured polyester, is applied over the primer layer. Examples of other topcoats which may be applied are based upon hydroxy functional polyethers reacted with isocyanates and hydroxy functional acrylics reacted with isocyanates.

The primer may be clear. However, if desired, pigment, up to about 20 percent by weight relative to total amount of chlorinated polyolefin and rubber modified epoxy resin may be added. To enable pigment to be added, it is sometimes necessary to add a grinding additive, such as a pigment dispersant or functional resin, up to about 40 percent by weight relative to total amount of chlorinated polyolefin and rubber modified epoxy resin.

The invention will now be described in greater detail by way of specific examples.

EXAMPLE 1

A primer composition in accordance with the present invention is formulated as follows:

| Component | Wt % |
| --- | --- |
| Toluene | 52.61 |
| Xylene | 39.44 |
| Superchlon ® 822-S* | 3.15 |
| Kelpoxy ® G272-100** | 4.80. |

*Chlorinated polypropylene sold by Sanyo-Kokusaku containing a minor amount of grafted maleic anhydride residue moieties.
**Rubberized epoxy resin (adduct of carboxyl-terminated nitrile resin and Bisphenol A epoxy resin sold by Reichold)

The primer was formed by simply dissolving the resins in the solvents to produce a homogeneous composition.

EXAMPLE 2

This following example is a test that was performed according to Chrysler specification using the primer of Example 1 on a plasticized polypropylene substrate sold by Multibase as Multiflex® A8502. The substrate was prepared by wiping with isopropyl alcohol. The primer was applied to the substrate and allowed to air dry for at least one minute, thereby producing a homogeneous, thermoplastic primer coating. A topcoat sold by Morton International Inc. as Softouch® ST696 (black color No. 90128) was admixed in a volume ratio of 7:2:2 with an isocyanate curative solution[1] and thinner solvent blend. Application was by handspray at 45 psi. After application, the topcoat was allowed to air dry for 10 minutes. This was followed by baking for 30 min.@ 180° F. (82° C.). In the following test results Society of Automotive Engineer standard tests are designated SAE; other tests are Chrysler tests.

| Procedure or Standard | Test Description | | Test Result |
| --- | --- | --- | --- |
| 463PB-15-01 | Initial Adhesion | Pass | No loss of Adhesion |
| 463PB-09-01 | Humidity 100 hr. | Pass | |
| 463PB-17-01 | Fadeometer 200 Hr. | Pass | Delta E: 0.12 Delta Gloss: 0.1 |
| 463PB-08-01 | Soap and Water | Pass | |
| 463PB-08-01 | Cycle Test, Method IV 5 cycles | Pass | |
| SAE-J861 | Crock Resistance 10 Cycles | Dry Pass | #5 |
| SAE-J861 | Crock Resistance 10 cycles | Wet Pass | #5 |
| 463PB-07-01 | Solvent wipe MS-1316 (naphtha) | Pass | |
| 463PB-43-01 | Mar Resistance | Pass. | |

[1]Morton International's Catalyst C694

EXAMPLE 3

This test, like Example 2, was performed according to Chrysler specification. The adhesion promoter was per Example 1. The substrate was Santoprene® 101-87, a highly plasticized polypropylene. The topcoat was SOFTOUCH® st696 (Color Saddle #94040). The primer was applied to provide a micron coat. After application, the primer was air dried for 90 sec. Then the topcoat was applied as per Example 2 to provide a 25 micron coat. The coated material passed the tests set forth in Example 2.

EXAMPLE 4

This Example represents testing according to Ford specification. Test numbers are Ford's test numbers. The coating protocol is the same as that used by Chrysler. The substrate is Multiflex® A8502, the primer as per Example 1, the topcoat is Softouch® ST696 (color medium opal #92061). Test results are as follows:

| Ford test no. | Test Description | Test Results |
| --- | --- | --- |
| 3.8.2 | Sward Hardness | Pass #8 |
| 3.8.3 | Adhesion | Pass |

-continued

| Ford test no. | Test Description | Test Results |
|---|---|---|
| 3.8.4 | Water Immersion (96 hrs. 90° F. (32° C.)) | Pass |
| 3.8.5 | Mar & Scratch | Pass, 10,000 cycles |
| 3.8.7 | Intercoat Adhesion | Pass |
| 3.8.9 | Water & Soap Spotting | Pass, water, soap |
| 3.8.10 | Perspiration Resistance | Pass |
| 3.8.11 | Fogging | Fail |
| 3.8.12 | Cleaning Solution | |
| A | Windex | Pass #4 |
| B | All Purpose | Pass #5 |
| C | Glass Cleaner | Pass #5 |
| D | Naphtha | Pass #4 |
| 3.8.13 | Heat Aging | Pass #4 |
| 8.8.15.2 | Accelerated Weathering | |
| | Xenon - 1000KJ | Delta E: 0.88 |
| | Xenon - 2000KJ | Delta E: 2.14 |

EXAMPLE 5

In this test, 180° peel strengths on various substrates were compared for various adhesion promoters. The test is not a recognized standard test, but is valid for relative comparisons. To run the test, a portion of the "bottom" of the test panel is masked; then adhesion promoter is applied to the test panel and allowed to air dry; and then the masking is removed. The panel is then coated with a 3.5 mil (85–90 microns) coat of a white exterior polyester/isocyanate coating designated 90246 R773 ELP. 1 cm scores are made in the test panel, providing 1 cm vertical strips of topcoat. The bottom of each topcoat strip (without adhesion promoter) is pulled away from the substrate and folded backwards. The panel is placed in the lower jaw of an Instron® model #4201 test instrument. One end of a piece of Scotch® tape is taped to the now-exposed inner surface of the folded back portion of the strip and the other end of the tape is inserted in the upper jaw of the Instron® 4210 instrument. Peel strengths, measured in kilograms per centimeter, are as follows (the first six samples are comparative; the last two in accordance with the invention):

| Adhesion Promoter | SEBS® COVERS | KRATON® | DF880 | SANTOPRENE® |
|---|---|---|---|---|
| HP 21054-4W1 | .17–.23 | .40 | 1.1 | .31 |
| HP 21054-4C1 | .19–.30 | .28 | 1.2 | .18 |
| HP 21054-4CS | .16–.30 | .51 | 1.2 | .27 |
| P46B | — | .37 | 1.0 | .32 |
| P46G | .15–.22 | — | — | — |
| P46C | .17–.26 | — | — | — |
| RB181DT | .5 | 1.1 | 1.0 | .45 |
| ABP695 | .78 | 1.48 | 1.4 | .73 |

The HP 21054 specimens are modified chlorinated polyolefin
The P46 formulations are mixtures of non rubber epoxy resin and modified chlorinated polyolefin
RB181DT, in accordance with the invention is 52 wt % rubber modified epoxy; 48 wt% chlorinated polyolefin ABP 695 is the adhesion promoter of Example 1.
SEBS® are covers made from thermoplastic polyolefin
Kraton® is an elastomeric material
DF880 is a thermoplastic polyolefin
Santoprene® is a highly plasticized polypropylene

What is claimed is:

1. A primer composition consisting essentially of a homogeneous mixture of:
   A) a chlorinated polyolefin formed from a polyolefin selected from the group consisting of polyethylene, polypropylene, polybutene, polypentene, polyhexene, copolymers thereof, and mixtures thereof, said polyolefin being chlorinated to between about 10 and about 30 wt % chlorine,
   B) a rubberized epoxy which is the reaction product of
      i) 100 parts of a Bisphenol epoxy resin having a weight average molecular weight of between about 300 and about 6000 and an epoxy equivalent weight of between about 150 and about 250, and
      ii) between about 50 and about 80 parts by weight relative to said 100 parts of Bisphenol epoxy resin of a rubber polymer formed from between about 50 mole percent and 100% of a conjugated diene selected from the group consisting of butadiene, isoprene and mixtures thereof, balance, comonomers selected from the group consisting of styrene, substituted styrene, acrylic acid, substituted acrylic acid, esters of acrylic acid, substituted esters of acrylic acid, acrylonitrile and mixtures thereof; said rubber polymer having a weight average molecular weight of between about 2500 and about 4000, said rubber polymer being terminated with an epoxy-reactive moiety selected from the group consisting of carboxyl, amine, hydroxy and mixtures thereof,
   said rubberized epoxy having an epoxy equivalent weight of between about 200 and about 1000;
   said chlorinated polyolefin A) comprising between about 30 and about 60 wt % of said primer composition and said rubberized epoxy comprising between about 40 and about 70 wt % of said primer composition,
   said chlorinated polyolefin A) containing no chemical moieties that are reactive with said rubberized epoxy B), said primer composition containing no epoxy curative or epoxy cure catalyst, whereby said homogeneous primer composition when applied to a substrate and in dry form may be dissolved from the substrate in an organic solvent in which said components A) and B) are mutually soluble.

2. A composition according to claim 1 wherein said rubber polymer is a copolymer of butadiene and acrylonitrile.

* * * * *

UNITED STATES PATENT AND TRADEMARK OFFICE
CERTIFICATE OF CORRECTION

PATENT NO. : 5,480,939
DATED : January 2, 1996
INVENTOR(S) : Jackson et al.

It is certified that error appears in the above-indentified patent and that said Letters Patent is hereby corrected as shown below:

Col. 4, line 32, first column in table
"463PB-08-01" should be "453PB-08-01"

Col. 4, line 49, "10" should be before -- micron --.

Signed and Sealed this

Seventeenth Day of December, 1996

Attest:

BRUCE LEHMAN

Attesting Officer     Commissioner of Patents and Trademarks